United States Patent [19]

Kawamura et al.

[11] 4,322,142
[45] Mar. 30, 1982

[54] SINGLE-LENS REFLEX CAMERA LIGHT MEASUREMENT AND EXPOSURE CONTROL APPARATUS

[75] Inventors: Kunio Kawamura, Sakai; Hiroshi Ueda, Nara, both of Japan

[73] Assignee: Minolta Camera Kabushiki Kaisha, Osaka, Japan

[21] Appl. No.: 227,794

[22] Filed: Jan. 23, 1981

[30] Foreign Application Priority Data

Jan. 23, 1980 [JP] Japan .................................. 55-7098

[51] Int. Cl.³ ........................ G03B 3/10; G03B 7/099; G03B 7/26
[52] U.S. Cl. ........................................ 354/25; 354/31; 354/60 E
[58] Field of Search .................. 354/25 R, 25 A, 25 P, 354/31, 31 F, 54–56, 60 R, 60 E, 60 L, 152

[56] References Cited

U.S. PATENT DOCUMENTS

| | | | |
|---|---|---|---|
| 4,019,191 | 4/1977 | Miyata | 354/31 X |
| 4,075,640 | 2/1978 | Veda et al. | 354/31 |
| 4,083,056 | 4/1978 | Nakamura et al. | 354/31 F X |
| 4,104,654 | 8/1978 | Maitani et al. | 354/31 |

*Primary Examiner*—L. T. Hix
*Assistant Examiner*—William B. Perkey
*Attorney, Agent, or Firm*—Watson, Cole, Grindle & Watson

[57] ABSTRACT

An electrical shutter type TTL single-lens reflex camera, with a movable mirror diagonally located within the photographic optical path to project object light to a viewfinder system during object observation and retractable from the optical path during photographic exposure, incorporates a light measurement device with a first light measuring element arranged for average light measurement of the light reflected from the movable mirror during object observation, at least part of the movable mirror being made transparent, or of a half mirror, to divide the object light into reflected light and light projected through the plane of the mirror. A second light measuring element is located to carry out spot metering on an object from the light projected through the plane of the movable mirror during object observation. A third light measuring element is located to receive reflected object light from a shutter curtain surface and/or the film surface for selection of average light measurement and spot metering on the object during photographic exposure. A manually operable selector selectively connects either the first or second light measuring element to an exposure information indicating device. The third light measuring element is adapted to be changed from average light measurement or to spot metering and to provide respective outputs representative thereof, such that exposure control with average light measurement or spot metering is obtainable from an exposure control circuit responsive to either output of the third light measuring element. In response to the selection of the first light measuring element by the manually operable selector, the third light measuring element is changed over for average light measurement, and in response to the selection of the second light measuring element, the third light measuring element is changed over for spot metering.

14 Claims, 6 Drawing Figures

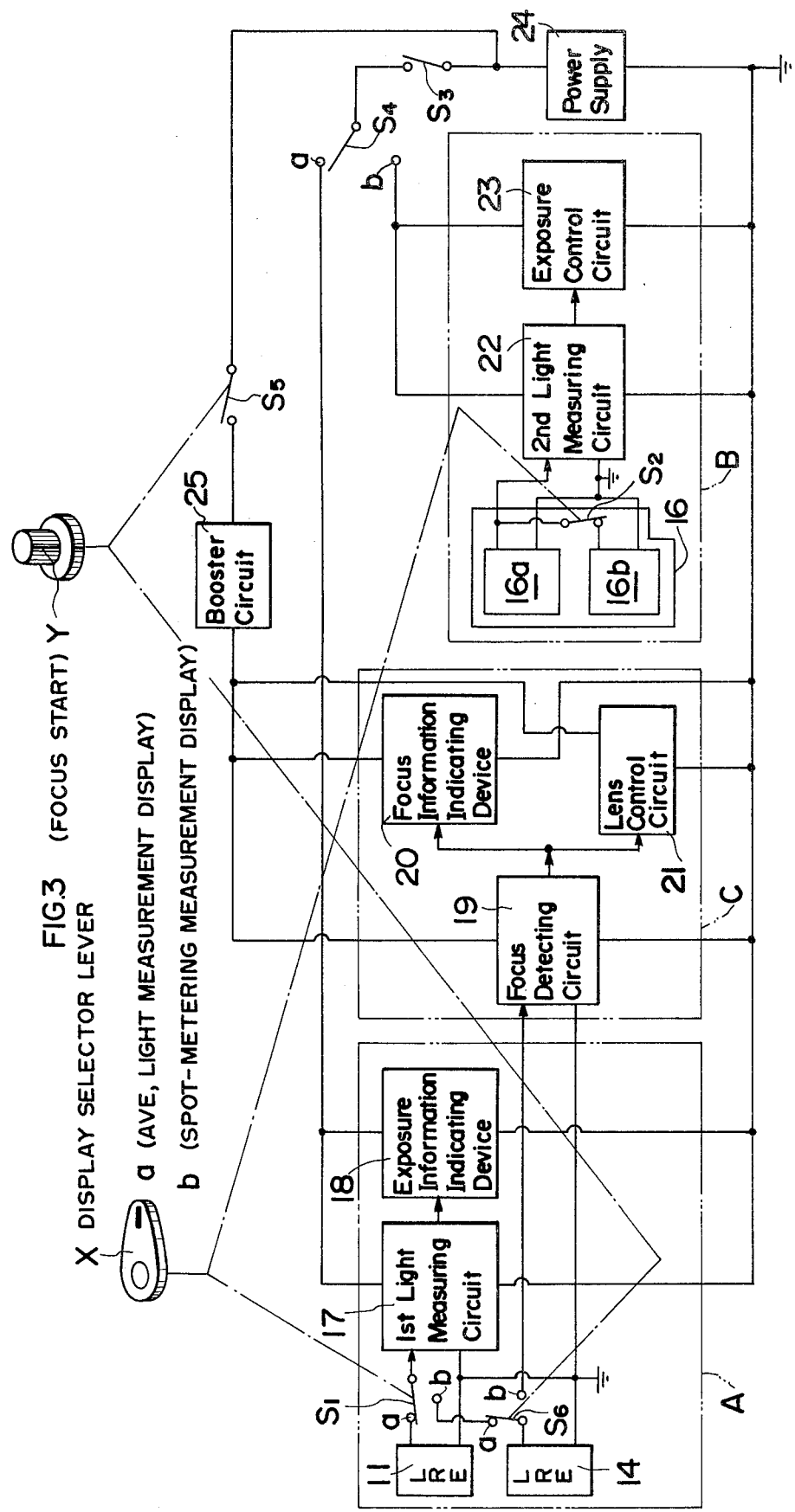

SINGLE-LENS REFLEX CAMERA LIGHT MEASUREMENT AND EXPOSURE CONTROL APPARATUS

BACKGROUND OF THE INVENTION

1. Field of the Invention

The present invention relates to an improved TTL light measurement device or system for use in single-lens reflex cameras capable of measuring the light of an object passing through an objective lens for exposure information display and automatic exposure control based on the light measurement value.

2. Prior Art

Some prior art TTL light measurement systems for single-lens reflex cameras may be classified as follows.

(a) A system in which a light receiving element is disposed on the light emission surface (as disclosed in U.S. Pat. No. 3,478,663) or roof of a penta prism, or disposed behind a condenser lens beneath the penta prism so as to receive a part of the object light divided by a partially reflecting and partially light-transmitting mirror located within the condenser lens assembly. Light measurement is obtained from the light reflected from a movable mirror positioned diagonally with respect to the photographic optical axis for observing the image of an object.

(b) A system as disclosed in U.S. Pat. No. 3,468,233, for example, in which the central part of a movable mirror is made semi-transparent such that the light passing the semitransparent portion is directly reflected by an auxiliary mirror hinged at the back of the movable mirror to a light receiving element on the bottom of the mirror chamber.

(c) A system as proposed in U.S. Pat. No. 3,687,026, for example, in which a light receiving element is positioned on the bottom or the side of the mirror chamber to face the focal plane of the camera so that light measurement is possible with the light reflected from an exposed film surface or the portion of the leading shutter curtain covering the film surface.

To obtain both exposure information display and automatic exposure control in accordance with the light measurement output obtained by such prior art light measurement systems, light measurement systems (a) and (c) are provided in a single camera. The former system is used for exposure information display and the latter system for automatic exposure control. Alternatively, light measurement systems (a) and (b) are provided for separate use in exposure information display and exposure control systems.

According to the prior art light measurement systems (a) and (b), the light to the light receiving element is inevitably blocked during the exposure as the mirror is retracted. Thus, with such systems, exposure time control is based on a stored light measurement output which is stored immediately before such light blockage. Therefore, the light measurement systems (a) and (b) require a structure for the storage of a light measurement value as well as various other related considerations. Furthermore, such storage-type control makes it impossible to accommodate any change of scene brightness occurring during the period from the completion of the storage of a light measurement value to the commencement of exposure. Moreover, with light measuring systems (a) and (b), auto-flash exposure control by metering flash light reflected from the film surface is impossible.

However, light measurement system (c) does not have the above-described disadvantage in terms of exposure time control. But, because a movable mirror intercepts the light to be incident upon a light receiving element unless it is positioned out of the optical path, the light measurement output cannot be used for exposure time display. Furthermore, the light receiving element, located outside the photographic optical path, is inevitably inclined to the focal plane so as to face the film surface, thereby making it difficult to adjust the light receiving surface of the light receiving element within a plane optically equivalent to the film surface. Therefore, the light receiving element in that light measurement system cannot be used as a focus detecting element.

Furthermore, light measurement system (a) is suitable for averaged light measurement but requires a condenser lens, a light receiving angle limit frame and a hood to be provided between a penta prism and a light receiving element for narrow-angle light measurement, i.e., spot-metering, thereby adversely affecting the camera appearance and also making the camera manufacture more difficult. Even a system requiring a semitransparent mirror within a condenser lens requires a light receiving element projecting from the back of the camera body, causing the actual design and manufacture of the camera to be difficult. Light measurement system (b) is limited for use in spot-metering due to the features of its optical system.

SUMMARY OF THE INVENTION

The primary object of the present invention is to provide a light measurement device which optimally utilizes various types of light measurement systems for exposure information display and automatic exposure control by the optional selection of either average light measurement of spot-metering light receiving elements and circuitry associated therewith.

Another object of the present invention is to provide a light measurement device which eliminates storage circuitry previously considered necessary for automatic exposure control, thereby minimizing the number of parts and simplifying the construction of cameras utilizing the exposure information display and automatic exposure control circuitry of the invention.

Still another object of the present invention is to provide a light measurement device which is capable of adapting to any sudden change in scene brightness even if light measurement is made during photographic exposure and to provide accurate automatic exposure control at all times.

To attain the above objects, the light measurement device of the present invention includes a movable mirror which is diagonally located in a plane transverse to, and within, the photographic optical path when an object image is observed and is retracted outside the optical path during photographic exposure. At least part of the movable mirror is made transparent or a half mirror is used to divide object light into light reflected from the mirror and non-reflected light (light projected through the non-mirror portion) so that either average light measurement, using the light reflected from the movable mirror, or spot-metering, using the non-reflected light, is selectable for light measurement when an object image is observed to display exposure information based on the light measurement value with the movable mirror in the photographic optical path.

For photographic exposure with the mirror either within the photographic optical path or retracted therefrom, the object light reflected from a leading shutter curtain surface and/or a film surface is measured by an average light measurement system for exposure information display, and exposure control is based on the average light measurement. When the projected light is measured according to the spot-metering system for exposure information display, the exposure can be accomplished using the spot-metered measurement information.

In the device of the present invention, the light receiving element which receives the light transmitted from the movable mirror for spot-metering may be also utilized as a light measurement element for focus detection.

BRIEF DESCRIPTION OF THE DRAWINGS

The above objects, advantages and features of the invention are apparent from the following detailed description of preferred embodiments setting forth the best mode of carrying out the invention when taken in conjunction with the drawings, wherein:

FIG. 3 is a block diagram of the preferred embodiment of an exposure information display and exposure control circuit of the present invention using a light measurement device of the present invention as represented by the exemplary embodiments of FIGS. 4A and 4B;

DETAILED DESCRIPTION

Figure 1:
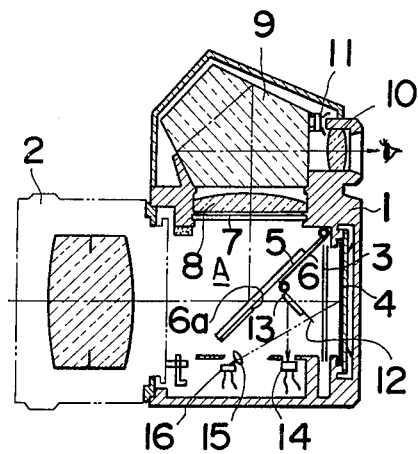
FIG. 1 is a longitudinal sectional view of an essential portion of an embodiment of a single-lens reflex camera of the present invention showing the components during observation of the object.
Figure 2:
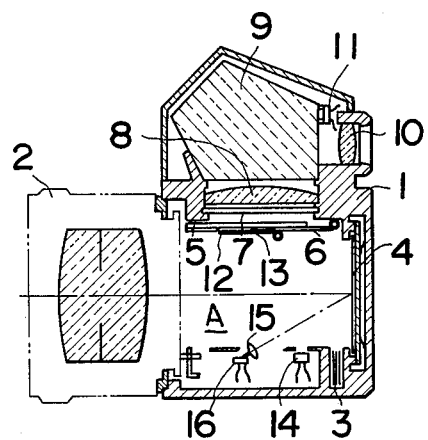
FIG. 2 is the same sectional view as that of FIG. 1 but showing the positioning of the components during photographic exposure.

FIGS. 1 and 2 illustrate a longitudinal sectional view of a single-lens reflex camera in order to show a representative example of a layout of individual light measuring elements in accordance with the present invention. FIG. 1 illustrates a movable mirror diagonally located within the photographic optical path during object image observation, and FIG. 2 shows the movable mirror retracted outside the photographic optical path during photographic exposure. In the object image observation condition of FIG. 1, movable mirror 5, at least part of which is made transparent, or constructed as a half-mirror, is retained by mirror holding frame 6 within the photographic optical path from objective lens 2 to shutter curtain 3 and/or film 4. Mirror holding frame 6 is retractably mounted on camera body 1. Movable mirror 5 is diagonally located at an angle of substantially 45° to the photographic optical axis to reflect part of the object light from objective lens 2 to a known viewfinder system comprising focusing plate 7, condenser lens 8, penta prism 9, eyepiece 10 and other elements not illustrated but known to the art. Average light measuring element 11 is arranged as illustrated, e.g., on top of the light emission surface of penta prism 9, so that it receives the light reflected by movable mirror 5 for average light measurement. Average light measurement is that light measurement output obtained from a light receiving element exposed to reflected light from most, or all, of an object as opposed to light measurement in accordance with well-known spot-metering techniques. Disposed behind movable mirror 5 is auxiliary mirror 13 held by auxiliary mirror holding frame 12 which is hinged to mirror holding frame 6. Auxiliary mirror 13 reflects part of the object light transmitted through the transparent or half-mirror portion of movable mirror 5 directly to spot-metering light receiving element 14 disposed at a position optically equivalent to the surface of leading shutter curtain 3 or film 4. Auxiliary mirror holding frame 12 is at an angle of substantially 90° with respect to movable mirror 5 when auxiliary mirror 13 is in the observation position of FIG. 1, and shields or blocks the transparent or half-mirror portion of movable mirror 5 when auxiliary mirror 13 is in the photographic position of FIG. 2, thereby preventing any undesirable light emanating from viewfinder eyepiece 10 into mirror chamber A. Spot-metering light receiving element 14 providing exposure information display is comprised of, for example, a light receiving element array consisting of a plurality of photoelectric elements arranged in a specific pattern. Light receiving element 14 is also used as a focus detecting element of a focus detecting device which detects focus conditions by comparing signals output from the photoelectric elements responsive to the contrast of an object image on a plane equivalent to the film.

Movable mirror holding frame 6 carries opening 6a which allows the light passing through the transparent or half-mirror portion of movable mirror 5 for spot-metering to pass through the holding frame. With that construction, exposure information display is provided (as described hereinafter) by a selected system of light measurement for either average light measurement or spot-metering light measurement.

With the camera shutter released, movable mirror 5 is retracted outside the photographic optical path in a well-known manner and in response thereto, auxiliary mirror 13 is also retracted outside the photographic optical path in a known manner subsequent to the retraction of movable mirror 5, the diaphragm of objective lens 2 is stopped down, causing leading shutter curtain 3 to start moving for commencement of an exposure as shown in FIG. 2. With reference to FIGS. 1 and 2, the light reflected from leading shutter curtain 3 and/or the light reflected from a film to be exposed during or after the travel of leading shutter curtain 3 is projected by condenser lens 15 to light receiving element 16 for exposure control, so that the exposure time is controlled by the light measurement output therefrom. The leading shutter curtain surface is substantially equal in reflectance to the film surface. Light receiving element 16 is divided into two portions, as described hereinafter, corresponding respectively to an average light measurement condition and a spot-metering condition; and in accordance with exposure information display obtained in response to the average light measurement value or to the spot-metering light measurement value, the output of light receiving element 16 is changed, whereby exposure control is possible by either type of light measurement. This is necessary because the exposure information displayed is desirably matched to that exposure information used for actual exposure control, and the output levels between the corresponding light receiving elements are preferably calibrated.

FIG. 3 is a block diagram illustrating the preferred embodiment of an exposure display and control system using the light measurement device of FIGS. 1 and 2 and representing the best mode of carrying out the present invention.

The exposure information display and control system is conveniently divided into three main sections, namely, display circuit system A, control circuit system B, and focusing circuit system C. Display circuit system A includes light receiving elements 11 and 14 (as described, supra, with respect to FIGS. 1 and 2), first light measuring circuit 17, exposure information indicating device 18, selector switch S1 and exposure focus changeover switch S6. Control circuit system B includes respective first and second light receiving sections 16a, 16b, second light measuring circuit 22, exposure control circuit 23, and average spot changeover switch S2. Focusing circuit system C includes focus detecting circuit 19, focus information indicating device 20 and lens control circuit 21.

Electrical power is provided to display circuit system A and control circuit system B through power switch S3 and display changeover switch S4 from power supply 24 in a manner to be described, infra. Electrical power is supplied from power supply 24 to focusing circuit system C through focus start switch S5 and booster circuit 25.

Exposure focus changeover switch S6 and focus start switch S5 are ganged together and actuated by focus start button Y. Selector switch S1 in display circuit system A and average/spot changeover switch S2 in control circuit system B are also ganged together and actuated by selector lever X, which is externally mounted on the camera body in a location convenient for the camera operator. The operation of the above-mentioned switches is more fully described, infra.

With continuing reference to FIG. 3, light receiving elements 11 and 14 in display circuit system A correspond to the same elements described in FIGS. 1 and 2 for use in average light measurement and in spot-metering for exposure information display. Either light receiving element 11 or 14 is connected by selector switch S1, movable in response to the operation of display selector lever X and mounted outside the camera body, to first light measuring circuit 17, and in response to an output therefrom, exposure information indicating device 18 displays the exposure information.

As described previously, light receiving element 14 for displaying exposure information by spot-metering is also used as a light measuring element for focus detection as is described, infra. Light receiving element 14 is normally connected to first light measuring circuit 17 through contact a of exposure focus changeover switch S6. When exposure-focus changeover switch S6 is set to contact b upon depression of focus start button Y (to be more fully described, infra), focus information indicating device 20 in focusing circuit system C indicates the focusing condition by means of an indicating device such as, for example, a light emitting diode (LED) pointer or other known indicating mechanisms. Focus information indicating device 20 is controlled by the output of focus detecting circuit 19, which also actuates objective lens control circuit 21 which in turn operates a motor, springs, or other known mechanism for moving objective lens to a focus position and stopping it there.

With respect to control circuit system B, light measuring element 16 for exposure control comprises, first light receiving section 16a for spot-metering and second light receiving section 16b (which may be connected in parallel with first light receiving section 16a through switch S2 as described, infra) for average light measurement. The changeover of light receiving sections 16a and 16b is made by average/spot changeover switch S2, linked with display selector switch S1, and controlled by display selector lever X, to provide either an output from first light receiving section 16a only (with average/spot changeover switch S2 open), or a combined output from the parallel connection of first and second light receiving sections 16a and 16b (with average/spot changeover switch S2 closed). One of the two outputs is input to second light measuring circuit 22, whereby exposure control is carried out by exposure control circuit 23 in the next stage.

Also included in FIG. 3 are power supply 24, booster circuit 25, power switch S3 (which is closed upon depression of a (not shown) shutter release button), display-control changeover switch S4 (which changes the power connection from display circuit system A to control circuit system B immediately before movable mirror 5 (FIGS. 1 and 2) is retracted out of the photographic optical path), and focus start switch S5 which is closed when externally operable focus start button Y is depressed.

Figure 4A:
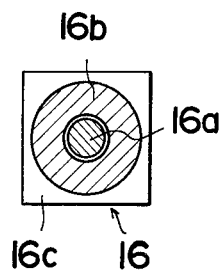
FIGS. 4A and 4B represent respective alternative embodimens of a two part light receiving element for measuring the light reflected from both the central and peripheral portions of a film surface and/or a shutter curtain surface.

FIG. 4A shows one example of the manner in which the first and second light receiving sections 16a, 16b of light receiving element 16 for exposure control (as described, supra, with respect to FIG. 3) may be constructed. First light receiving section 16a is a circular-shaped light receptor of a substance well known to those skilled in the art and is surrounded by annularly-shaped second light receiving section 16b. Both first and second light receiving sections 16a, 16b are formed on chip 16c in a manner well known to those skilled in the art.

Figure 4B:
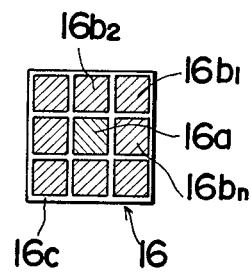

FIG. 4B is an alternative embodiment of the first and second light receiving sections 16a, 16b in which the light receiving sections are square-shaped and consist of centrally positioned first light receiving section 16a and peripherally located second light receiving sections 16b1, 16b2 ... and 16bn surrounding first light receiving section 16a. As in the exemplary embodiment of FIG. 4A, both of the light receiving sections are mounted on a single chip.

Figure 5:
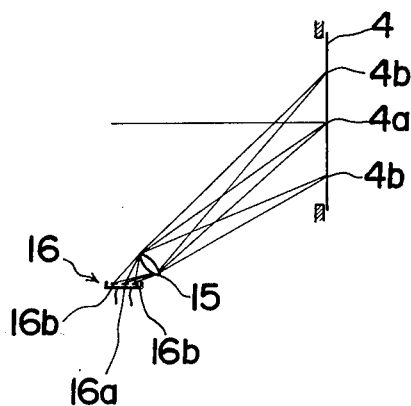
FIG. 5 illustrates the principles of operation of the two part light receiving elements of FIGS. 4A and 4B in an optical system for measuring the light reflected from both the central and peripheral portions of a film surface and/or a shutter curtain surface.

The principle of operation of first and second light receiving sections 16a, 16b is shown in FIG. 5. First light receiving section 16a receives the light reflected from central portion 4a of the surface of a film or a shutter curtain through condenser lens 15. Second light receiving section 16b, or 16b1 through 16bn, receives the light reflected from peripheral portions 4b of the surface of the film or the shutter curtain. An output from first light receiving section 16a alone is used as a spot-metering signal, and an output from the parallel connection of first light receiving section 16a and second light receiving section 16b, or 16b1 through 16bn, is used as an average light measurement value.

The following is a description of the operation of the preferred embodiment of the exposure information display and control system as illustrated in FIG. 3. Exposure control operation in accordance with average light measurement is obtained by aligning the index of display selector lever X with mark a as illustrated in FIG. 3 (for average light measurement display) such that selector switch S1 is closed on contact a. If focus start button Y is depressed, with the movable contact of focus start switch S5 and exposure focus changeover switch S6 positioned as shown in FIG. 3, focus start switch S5 is closed, causing power supply 24 to be connected through power booster circuit 25 to focusing circuit system C. Simultaneously therewith, the movable contact of exposure-focus changeover switch S6 is switched from normally closed terminal a to terminal b, whereby the output from light receiving element 14 is processed by focus detecting circuit 19 and then displayed by focus information indicating device 20. Objective lens 2 (FIGS. 1 and 2) is driven through objective lens control circuit 21 to a focus position and is then stopped.

When the shutter release button (not shown) is partially depressed, power switch S3 is closed, causing power supply 24 to be connected through display-control changeover switch S4 (the movable contact of which is normally closed at terminal a) to display circuit system A, whereby an output from light receiving element 11 for average light measurement is processed by first light measuring circuit 17 for exposure information display by exposure information indicating device 18.

When the shutter release button is further depressed, movable mirror 5 is rapidly retracted upwardly to reach the position shown in FIG. 2, and the objective lens diaphragm is stopped-down to a predetermined position. Immediately before movable mirror 5 is retracted, display-control changeover switch S4 is changed over to contact terminal b to cut off electrical power to display circuit system A, thereby terminating the display and connecting power supply 24 to exposure control circuit system B. The positioning of display selector lever X in alignment with the average light measurement display mark a, as previously described, causes average/spot changeover switch S2 to be closed, thereby causing the output of first light receiving section 16a and the output, or outputs, of second light receiving section 16b to be connected in parallel with one another. Thus, the combined quality of light from both light receiving sections is processed by second light measuring circuit 22, and exposure control is obtained in response to an average light measurement value through exposure control circuit 23, which is responsive to the output of second light measuring circuit 22.

The following is a description of exposure control with light measurement by spot metering.

The index mark on display selector lever X is aligned with spot-metering measurement display mark b to display selector switch S1 to terminal b and to open average/spot changeover switch S2. Focusing at this time is accomplished as described previously. With the shutter release button partially depressed, exposure information display in accordance with spot-metering measurement is obtained in accordance with the output from light receiving element 14 through display circuit system A as described previously with respect to the display of average light measurement values. Exposure focus changeover switch S6 contacts terminal a unless focus start button Y is depressed, which would cause focus changeover switch S6 to contact terminal b. With the shutter release button depressed farther, movable mirror 5 is retracted, causing the diaphragm to be stopped-down and the shutter to be opened. At this time, exposure control light measuring element 16 carries out exposure control in accordance with only the output from first light receiving section 16a based on the spot metering value because average/spot changeover switch S2 remains opened.

In accordance with the present invention, exposure information is displayed either by obtaining average light measurement using the light reflected from movable mirror 5 during observation of the object through the viewfinder, or spot-metering is effected on the light passing through the transparent or half-mirror portion of the movable mirror. Actual exposure control is effected through average light measurement or spot metering from the light reflected from the film surface at the focal plane or exposure surface, or from the shutter curtain surface. When the exposure information displayed is made by average light measurement, the exposure control is also made by average light measurement, and similarly, when the exposure information displayed is made by spot metering, the exposure control is also made by spot metering. Thus, these desired exposure information displays and exposure controls are made possible through selection of average light measurement or spot metering by optimum use of light measurement systems. Moreover, another advantage of the present invention is that the light measurement system for spot metering display is also made selectably usable for the camera operator for focus detection.

Those skilled in the art will also recognize that the exposure information display and exposure control system of the present invention as described herein is capable of being modified in accordance with known principles and techniques applicable to the art of the photography, and therefore the present invention is not intended to be limited by the specific embodiment herein described but the scope of the invention is to be determined by the following claims with consideration being given to the equivalents of the claimed components, individually and collectively in combination.

What is claimed is:

1. A single lens reflex camera, comprising:

a mirror movable between a viewing position intercepting a photographic optical path and a photographing position retracted from said photographic optical path, said mirror including means for projecting a portion of the object light in said optical path through the plane of the mirror, and means for reflecting another portion of the object light in said optical path;

first light receiving means receptive to light from said reflecting means and providing a first output signal representative thereof;

second light receiving means for receiving light projected by said light projecting means and providing a second output signal representative thereof;

third light receiving means for receiving light reflected from means located in the area of the focal plane and having at least one light reflecting surface in said photographic optical path, said third light receiving means including a first light receiving portion for receiving light reflected from a limited area of said at least one surface, and a second light receiving portion for receiving light reflected from areas of said at least one surface other than said limited area, said third light receiving means providing a third output signal representative of the light reflected from at least one of said first and second light receiving portions and a fourth signal representative of a combination of the light reflected from both said first and second light receiving portions;

means for displaying exposure information in response to said first and second output signals;

manually operable first switching means for selectively connecting said first and second light receiving means to said displaying means;

exposure control means for controlling photographic exposure in response to said third and fourth output signals; and manually operable second switching means for selectively electrically connecting said third signal and said fourth signal to said exposure control means.

2. A single lens reflex camera as claimed in claim 1 wherein said at least one light reflecting surface is the surface of a leading shutter curtain member and/or the film.

3. A camera as claimed in claim 2 further comprising a manually operable selector member interlocked with said first and second switching means, and movable between a first position such that said first and second switching means respectively connect said second output signal to said display means and said third signal to said exposure control circuit, and a second position wherein said first and second switching means respectively connect said first output signal to said display means and said fourth output signal to said exposure control means.

4. A camera as claimed in claim 3 wherein said first and second positions are a spot metering position and an average light measuring position and said portion of the object light is light from a limited area of the object field of the objective lens of the camera.

5. A camera as claimed in claim 1, wherein said second light receiving means is positioned within a plane optically equivalent to said area of the focal plane, and further comprising an auxiliary mirror mounted on the side of said movable mirror facing said area of the focal plane for reflecting the light projected through said projecting means to said second light receiving means.

6. A camera as claimed in claim 5 wherein said area of the focal plane is the surface of the film.

7. A camera as claimed in claim 5 or 6 further comprising focus detecting means for detecting the focus of the camera objective lens and providing a focus output signal for indication of the focus condition of the lens and for controlling the lens, and manually operable third switching means for connecting said second output signal to said focus detecting circuit.

8. A camera as claimed in claim 7 further comprising an electrical power supply, manually operable fourth switching means for connecting said electrical power supply to said focus detecting means and gang connected to said third manually operable switch means, a focus start member interlocked with said third and fourth manually operable switch means, and actuation of said focus start member connects said second output signal to said focus detecting circuit through said manually operable third switching means and connects said focus detecting means to said electrical power supply through said manually operable fourth switching means.

9. A camera as claimed in claim 1, wherein said second light receiving portion at least partially surrounds said first light receiving portion, and said limited area is the central portion of said at least one reflecting surface.

10. A camera as claimed in claim 9 wherein said at least one reflecting surface is the surface of a leading shutter curtain member and/or the film.

11. A camera as claimed in claim 10, wherein said second light receiving portion includes a plurality of light receptive elements.

12. A camera as claimed in claim 1, wherein said first, second and third light receiving means are respective photoelectric elements producing an electric signal in response to the brightness of light incident thereon.

13. A camera as claimed in claim 1 further comprising an electrical power supply and first electrical power switching means movable between a first position for connecting said electrical power supply to said means for displaying and a second position for connecting said electrical power supply to said exposure control means.

14. A camera as claimed in claim 13 further comprising second power switching means for connecting said first electrical power switching means and said electrical power supply upon closing, said second power switching means being closed upon initiation of photographic exposure.

* * * * *